United States Patent
Skinner et al.

(10) Patent No.: US 9,584,567 B2
(45) Date of Patent: Feb. 28, 2017

(54) METHOD, SYSTEM AND PROGRAM PRODUCT FOR COLLABORATION OF VIDEO FILES

(71) Applicants: Victor Janeiro Skinner, Grass Valley, CA (US); Eric Anthony Fleming, San Bruno, CA (US)

(72) Inventors: Victor Janeiro Skinner, Grass Valley, CA (US); Eric Anthony Fleming, San Bruno, CA (US)

( * ) Notice: Subject to any disclaimer, the term of this patent is extended or adjusted under 35 U.S.C. 154(b) by 0 days.

(21) Appl. No.: 14/196,441

(22) Filed: Mar. 4, 2014

(65) Prior Publication Data

US 2015/0256565 A1  Sep. 10, 2015

(51) Int. Cl.

| | |
|---|---|
| *G06F 15/16* | (2006.01) |
| *H04L 29/06* | (2006.01) |
| *G06F 17/30* | (2006.01) |
| *G11B 27/031* | (2006.01) |
| *H04N 21/4788* | (2011.01) |
| *H04N 21/81* | (2011.01) |
| *H04N 21/8547* | (2011.01) |

(52) U.S. Cl.
CPC ...... *H04L 65/403* (2013.01); *G06F 17/30781* (2013.01); *G11B 27/031* (2013.01); *H04N 21/4788* (2013.01); *H04N 21/8106* (2013.01); *H04N 21/8547* (2013.01)

(58) Field of Classification Search
CPC ............ H04L 65/403; G06F 17/30058; G06F 17/30849; G06F 17/30781; G11B 27/031; H04N 21/4788; H04N 21/8106; H04N 21/8547

USPC ................. 709/205; 704/258–269; 715/203; 84/600–601, 609
See application file for complete search history.

(56) References Cited

U.S. PATENT DOCUMENTS

| | | | |
|---|---|---|---|
| 6,636,889 B1 * | 10/2003 | Estrada ................. | G06Q 10/06 707/999.201 |
| 7,191,023 B2 | 3/2007 | Williams | |
| 8,035,020 B2 * | 10/2011 | Taub .................... | G10H 1/0058 84/600 |
| 8,806,320 B1 * | 8/2014 | Abdo ................ | G06F 17/30017 715/203 |
| 8,909,704 B2 * | 12/2014 | Flannagan .......... | H04L 12/1822 709/203 |
| 2002/0055788 A1 * | 5/2002 | Petrie ..................... | G06Q 10/10 700/2 |
| 2002/0091455 A1 * | 7/2002 | Williams ............. | G10H 1/0058 700/94 |
| 2007/0198534 A1 * | 8/2007 | Hon .................. | G06F 17/30058 |

(Continued)

*Primary Examiner* — Thu Ha Nguyen
(74) *Attorney, Agent, or Firm* — Law Offices of David M. Lang; David M. Lang

(57) ABSTRACT

A method, system and program product comprise communicating to a server system. The server system is at least configured to receive video/audio uploads from users, to maintain the uploads in a database of collaborations comprising video files where each of the video files comprises a same video file format, and to send to a user a collaboration. A collaboration from the server system is received for presentation to a user. A contribution to the received collaboration is recorded. The contribution is uploaded to the server system. The server system is further configured to process the contribution into the received collaboration to have the same video file format and to at least layer audio.

8 Claims, 8 Drawing Sheets

(56) References Cited

U.S. PATENT DOCUMENTS

| | | | |
|---|---|---|---|
| 2008/0050713 A1 | 2/2008 | Avedissian | |
| 2008/0050714 A1 | 2/2008 | Avedissian | |
| 2009/0015672 A1* | 1/2009 | Clapp | G06F 17/30817 348/143 |
| 2010/0095211 A1* | 4/2010 | Kenvin | G11B 27/034 715/723 |
| 2012/0260195 A1* | 10/2012 | Hon | G06F 17/30873 715/753 |
| 2013/0167039 A1* | 6/2013 | Howell | G06F 17/30867 715/748 |
| 2013/0179960 A1* | 7/2013 | Kee | G06Q 10/10 726/9 |
| 2013/0325970 A1* | 12/2013 | Roberts | H04N 21/4788 709/206 |
| 2014/0068254 A1* | 3/2014 | Scharf | G06F 21/6209 713/165 |
| 2014/0129942 A1* | 5/2014 | Rathod | H04N 21/44222 715/720 |
| 2015/0149540 A1* | 5/2015 | Barker | H04L 12/1827 709/204 |
| 2015/0222496 A1* | 8/2015 | Lewis | G06Q 10/101 715/723 |
| 2015/0222682 A1* | 8/2015 | Lewis | H04N 21/44016 715/719 |
| 2015/0318020 A1* | 11/2015 | Pribula | H04N 21/43615 386/227 |

* cited by examiner

METHOD, SYSTEM AND PROGRAM PRODUCT FOR COLLABORATION OF VIDEO FILES

CROSS-REFERENCE TO RELATED APPLICATIONS

Not applicable.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to collaboration of data. More particularly, the invention relates to collaboration and audio layering of video files.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Many musicians in the world want to be heard, and more than that, many may want to be seen and heard in harmony with other musicians. Musicians also want a simple way to collaborate with other musicians from anywhere, without any compatibility issues.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. One such aspect of the prior art teaches of a system that provides a virtual music studio on the internet. By way of educational background, another aspect of the prior art generally useful to be aware of discloses a system that may be configures to obtain payment from an artist before performance data such as audio and/or video data is uploaded to the community. Another such aspect of the prior art teaches of a system in which musical notes may be added, deleted, or moved, and section of notes may be transposed, quantized, etc. However, these solutions may be suitable for providing a platform for users to collaborate musical pieces and other works. A solution which did so would be desirable.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
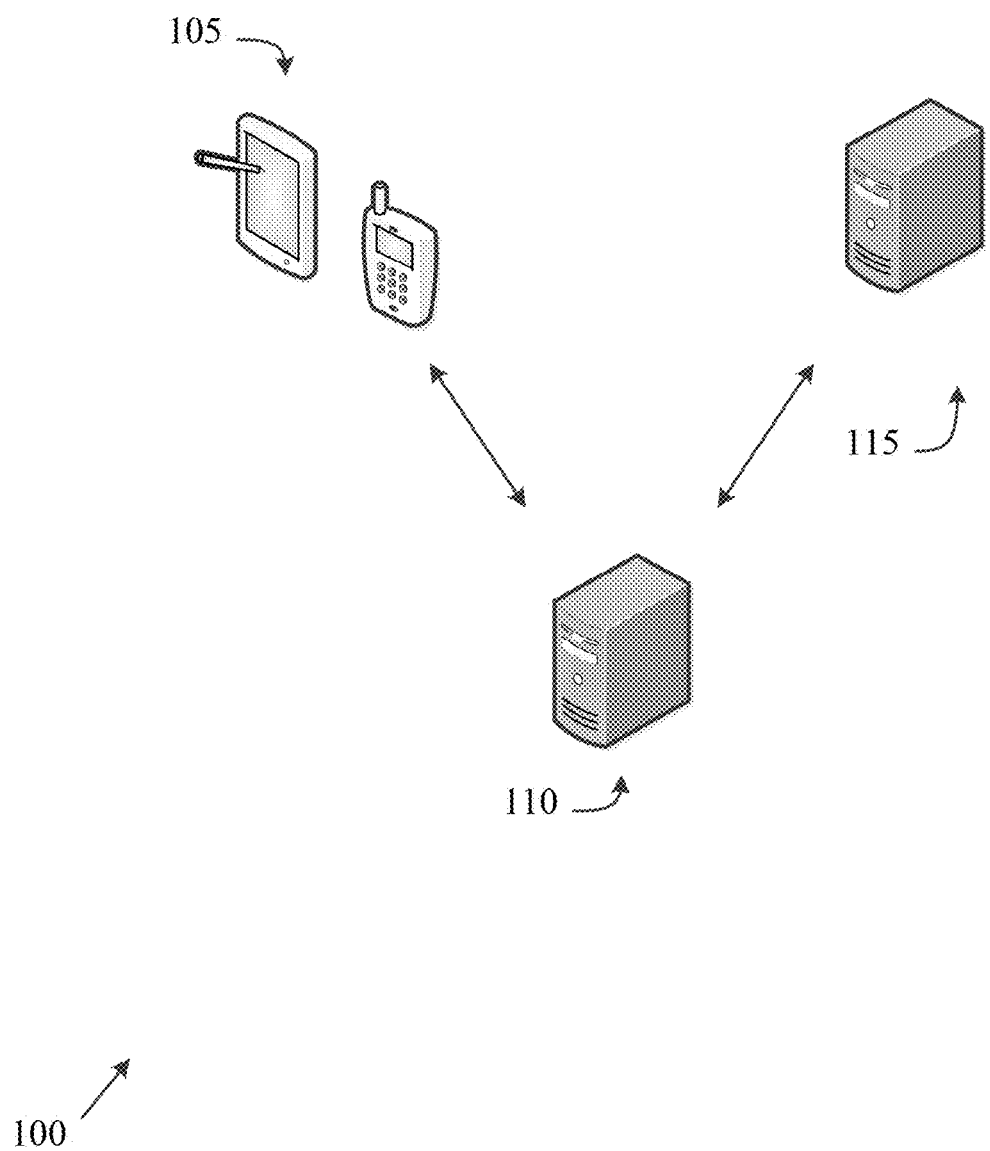
FIG. 1 is an illustration of an exemplary system for collaboration of user data, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Some embodiments may provide means and/or methods for users to collaborate with other users. In some embodiments, users may upload data using an internet service.

FIG. 1 is an illustration of an exemplary system for collaboration of user data, in accordance with an embodiment of the present invention. In the present embodiment, a first user may use an electronic device 105 to access data from a web server 110. In many embodiments, system may incorporate multiple servers 110. In some embodiments, any electronic device capable of receiving data from a server 110 may be suitable, including, without limitation, smartphones, tablets, laptop or desktop computers, etc. In the present embodiment, the first user may also use the electronic device 105 to send data to the web server 110. In some embodiments, web servers 110 may receive data from multiple users. In the present embodiment, a server 110 may store data in a database 115. In a non-limiting example, system may incorporate one or more SQL databases 115. In some embodiments, a server may combine data to form collaborations of data. In the present embodiment, a second user may use an electronic device 105 to send data to the server 110, and the server may form a collaboration of data from data received from the first user and data received from the second user. In a non-limiting example, system may perform decoding and/or encoding of data samples using a C compiler, such as, without limitation, Psyco.

In some embodiments, users may access embodiment software through various internet platforms, including, without limitation, websites or mobile applications. In some of these embodiments, software may be suitable to receive and/or transmit various types of data, including, without limitation, audio, video, images, and text.

Figure 2:
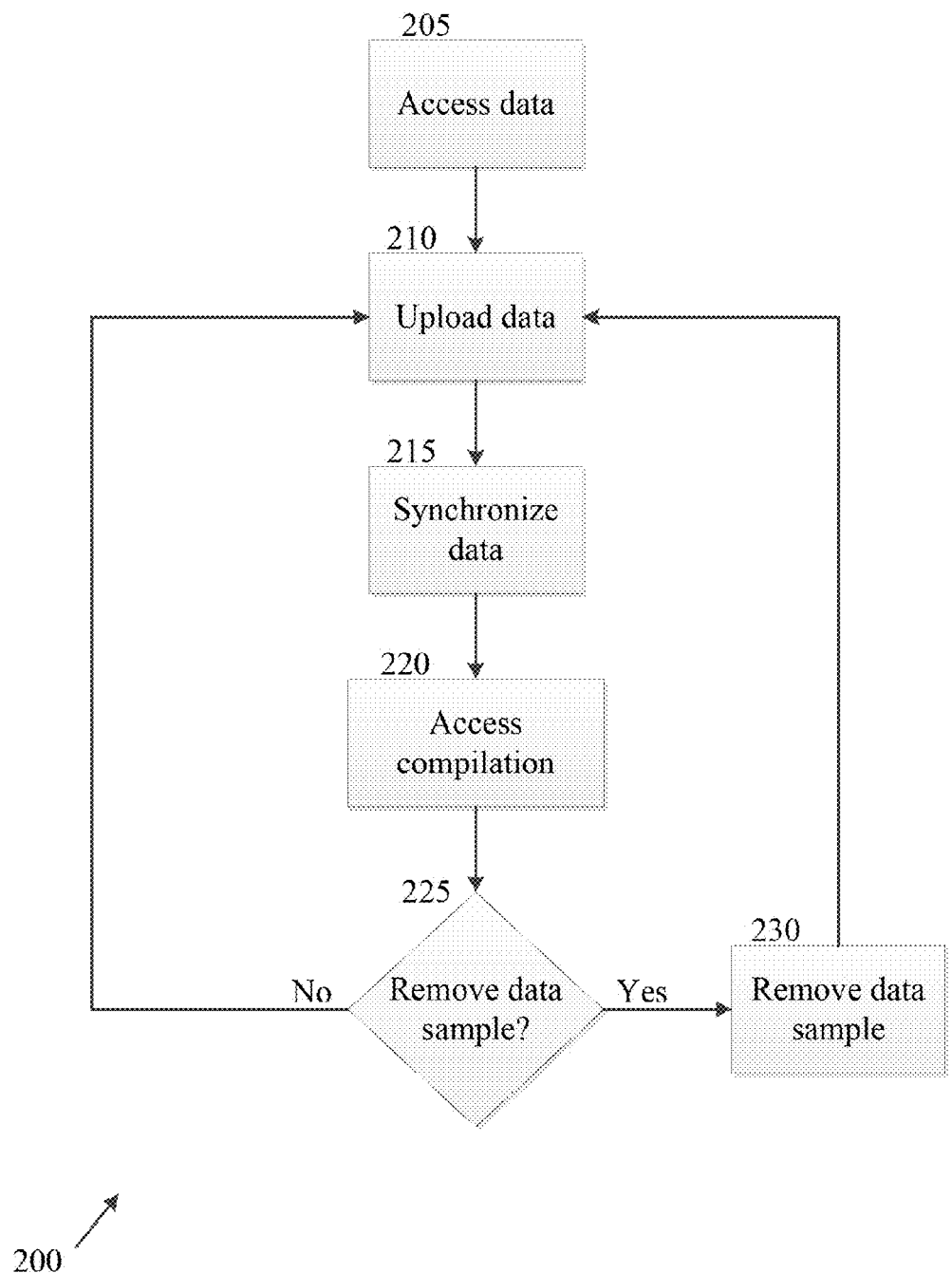
FIG. 2 is an illustration of an exemplary method for collaboration of user data, in accordance with an embodiment of the present invention.

FIG. 2 is an illustration of an exemplary method for collaboration of user data, in accordance with an embodiment of the present invention. In the present embodiment, users may access data in a step 205. In some embodiments, users may access data uploaded to the internet platform by other users. In a non-limiting example, a user may view a video or listen to an audio track submitted by another user. In many embodiments, the number of tracks may be one to an unlimited number. Audio only contributions may contain video attached as an audio visualization. In the present embodiment, a user may upload data to an internet platform in a step 210. In a non-limiting example, a user may view a musical video uploaded by another user, then upload a complementary video or audio file. The server 110 may process the video/audio uploads and layer the video's audio. If the upload is audio, a video file may be attached. In some embodiments, the video attached may have a music visualization. In many embodiments, all uploads will be in the video format. In many embodiments, any video format is accepted and converted into one constant file type. In many embodiments, any audio file is accepted, uploaded, then converted into the same constant video file format. In many embodiments, all the services will be available on the website, no downloads or software. In many embodiments, the system will entail the layering of uploaded video. In many embodiments, all videos that were synced at one time, will be semi-linked, as a non-limiting example, they are not permanently linked, but accessible at any time.

In many embodiments, all videos are open to anyone worldwide who wants to contribute/layer. In many embodiments, any video, even later contributions, may be a source video. In many embodiments, all tracks will layer the audio, and will also have the visual of the musician playing, or a music visualization. In many embodiments, the video string will continue parallel to the users contributing.

In many embodiments, may include virtual apparatus which allows a server to process video/audio uploads and layer audio for collaborative mixing. As a non-limiting example, if upload is solely audio, a video file will be generated with a music visualization. In many embodiments, collaborative mixing of video/audio uploads is performed in an asynchronous manner and accessible for users via the world wide web.

As a non-limiting example, starting with one video, there may be a limitless amount of secondary videos that are recorded off the base (original) video. Anyone may then listen to any of the combinations and then add to the music string. A limitless amount of additional videos may be made of that string. Anyone could then listen to any of the next combined music strings and add their own video. This may be repeated, so any uploaded single video may have limitless amount of possible combinations/strings with limitless possibilities. The website is for the musicians, but also for the non-musicians to listen to new music. In many embodiments, all services are offered through the website with no other downloads.

In some embodiments, all the video uploads may be synced/layered so that the audio can match up. In some embodiments, the server allows the users to upload videos. These videos will be layered with the audio from video. In some embodiments, a virtual system that facilitates the asynchronous music collaboration from layering the video and audio is included. In some embodiments, the server will facilitate the virtual collaboration and layering of the community (creative) commons. In some embodiments, all the video/audio files will be layered on the server. In some embodiments, the audio from videos submitted by users, may be layered into the strings of videos of the user who listens and then records along with the audio. In some embodiments, all the uploads may be video. Even the audio files will be video because of the attachments. In some embodiments, the uploads may be primarily video. All audio files will be accepted, but the audio files will have a video file attached. The audio upload will have a music visualization video file attached. In some embodiments, the music visualization will be for entertainment or professional uses. In some embodiments, all the video uploads that are semi-linked, will be layered by audio. In some embodiments, the videos may be viewed by a cell view, or the full screen of any video sequence. In some embodiments, the users may listen to the prior recordings with personal ear listening devices so the video will not have unnecessary background noise. In some embodiments, a virtual metronome may be present when recording, or adding to a track. This may only be available in the recording process to ensure all the tracks are synced. The metronome may be turned on or off, depending on the user's preference. In some embodiments, all the videos can be a source video. In some embodiments, any user's video may be a source video, even if the video was recorded over a base video. Some embodiments may include a social network option throughout the apparatus, especially pertaining to musicians. In some embodiments, the social networking may include for example, but not limited to, friending, video/string comments, friends, messaging, and personal profile. In some embodiments, personal profile can include, but not limited to, location, strings started/contributed, and all the relevant info the user wants to reveal. In some embodiments, a random playlist may exist. This playlist may comprise common strings of videos and/or most liked strings of video. In some embodiments, the playlist may be customized by, but not limited to, genre, popularity, instrument combinations, geographical locations, etc. In some embodiments, the users may post teaching videos pertaining to musical instruments, and/or the teaching videos. In some embodiments, a search-bar may be included on all pages of the website. In some embodiments, the search bar may search for, but not limited to, primarily the strings or songs, followed by participating instruments, musicians, or genres. In some embodiments, all searches may have filters to determine what the user is searching for. In some embodiments, an established professional musician or band may have a start video to attract traffic. In some embodiments a musician(s) may host tryouts to search for desired user to fill their position. In some embodiments, the user's location may be displayed on a virtual map. This shows viewers what part of the world the users from existing strings are playing from. In the present embodiment, users may sync multiple data samples in a step 215. In some embodiments, data samples may be from multiple users. In a non-limiting example, a first user may upload video B which may be complementary to a stored video A from a second user, and the first and/or second user may sync video B with video A to create a collaboration. In the present embodiment, users may access collaborations from any users in a step 220. Further, in the present embodiment, users may repeat previous steps to create collaborations of any number of data samples. In some embodiments, users may remove individual data samples from collaborations. In the present embodiment, a user may decide whether to remove individual data samples from a collaboration in a step 225. In the present embodiment, a user may remove one or more individual data samples from a collaboration in a step 230. In some embodiments, users may only remove data samples from copies of collaborations, and a server 110 may maintain original copies of collaborations. In other embodiments, users may remove individual data samples from original collaborations. In some embodiments, editing of data samples may be accomplished offline. In a non-limiting example, a user may download one or more files from a server, disconnect from the server, edit/add data samples, and reconnect to the server to upload the edited files.

In some embodiments, data uploads from users may be restricted to one or more allowable types of data, such as, without limitation, video. In a non-limiting example, all available user data may on an internet platform may be user videos. In the present non-limiting example, a user may submit an audio file, but the internet platform may convert the audio file to video using generic video data. In alternative embodiments, users may upload data of any type.

Some embodiments may allow users to provide feedback on individual data samples and/or collaborations from other users. In a non-limiting example, a user may select an "up vote" or a "down vote" for an individual data sample and/or a portion of a data sample. In another non-limiting example, a user may select a number of "stars" as a rating for a data sample and/or a collaboration. In some embodiments, an internet platform may store profiles for individual users which may show feedback individual users may have received. In a non-limiting example, a first user may receive a point each time another user submits positive feedback on an upload by the first user.

In some embodiments, software may automatically synchronize data samples. In other embodiments, users may manually synchronize data samples. In a non-limiting example, a user may view a graphical representation of one or more audio tracks and manually adjust portions of audio left or right and/or erase portions of audio. In the present non-limiting example, edits may be performed at any suitable resolutions, such as, without limitation, one or two milliseconds. In some embodiments, users may edit/move in a slide/drag option. In some embodiments, data samples may have attached files, such as, without limitation, .WAV files, for matching up to other data samples.

Some embodiments may allow users to access data in a variety of ways. In a non-limiting example, a user may create a playlist of musical tracks submitted by users or listen to a random playlist generated by the software. In another non-limiting example, users may performs searches of data samples and/or collaborations, using a search based on, without limitation, title of data, name of uploading user, or genre. In another non-limiting example, software may store a record of activity by individual users, and users may view activity history.

In some embodiments, internet platform may have a graphical representation of user locations. In a non-limiting example, a user may select a collaboration, and software may display a world map showing a general location of each user involved in the collaboration, as well as some profile information about each user.

Some embodiments may allow users to communicate with other users through an internet platform. In a non-limiting example, a first user may add a second user as a "friend", which may allow the first user to more easily communicate with the second user. In another non-limiting example, users may post requests for edits and/or submissions of data samples. In the present non-limiting example, a band may host auditions which may be advertised on a home page of an internet platform for a fee.

In some embodiments, internet platform may provide various features to assist users. In a non-limiting example, an internet platform may have training videos for users who may wish to learn to play an instrument. In another non-limiting example, an internet platform may have a metronome or other means for time-keeping which users may use while making recordings. In another non-limiting example, an internet platform may allow users to add distortion, feedback, sustain, etc. to data samples. In some embodiments, users may post instructional videos to assist other users.

Some embodiments may incorporate an Application Programming Interface. In a non-limiting example, a group of users may construct a website which may facilitate collaborations of the group, as well as serve as a sub-database of collaborations of the group.

Figure 5:
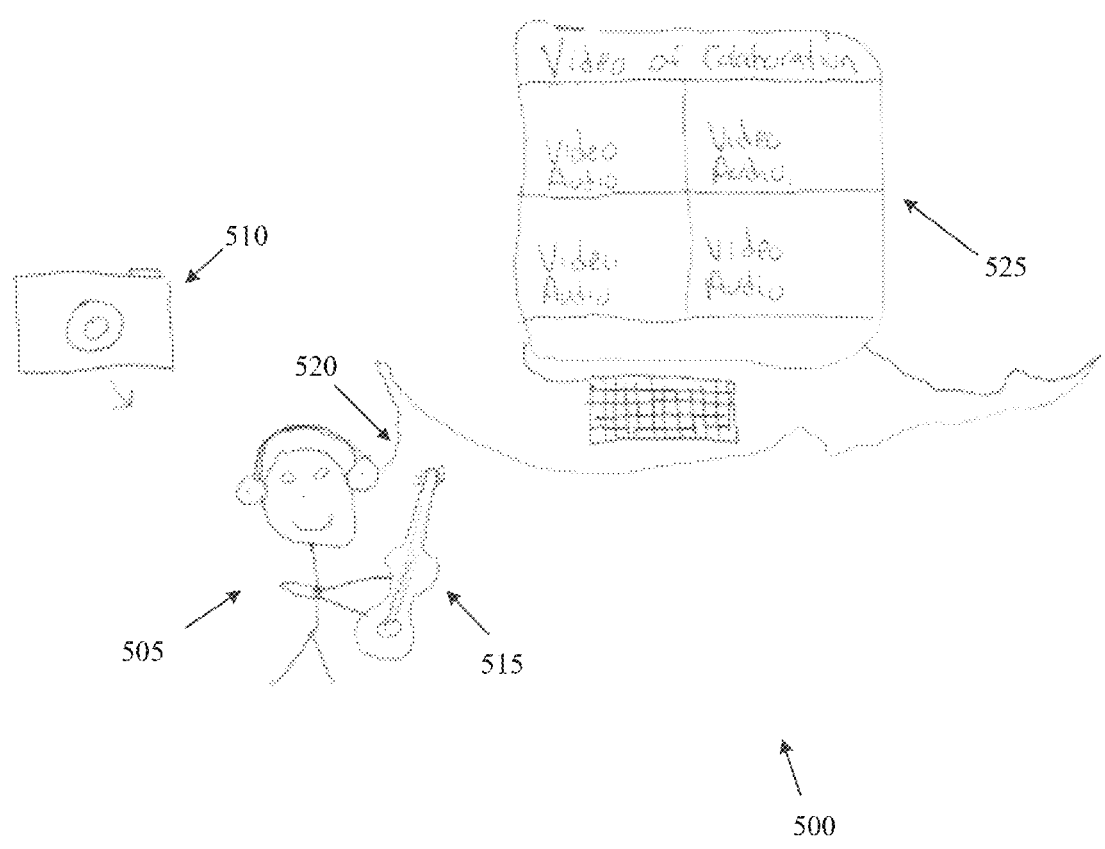
FIG. 5 is an illustration of an exemplary system in use by a user, in accordance with an embodiment of the present invention.

FIG. 5 is an illustration of an exemplary system in use by a user, in accordance with an embodiment of the present invention. In the present embodiment, a user 505 may use a recording device 510 to record user actions. In a non-limiting example, a recording device may be a stand-alone device such as, without limitation, a camera. In an alternative non-limiting example, a recording device 510 may be part of another device, including, without limitation, a smartphone or a desktop computer. In the present embodiment, a user 505 may use an instrument 515 to create a musical recording. In a non-limiting example, a guitar may be a suitable instrument 515. In the present embodiment, a user may use a listening device 520 to listen during a recording. In a non-limiting example, headphones may be a suitable listening device 520. In some embodiments, user 105 may listen to other media during recording. In other embodiments, user 105 may listen to self during recording. In the present embodiment, a visual display device 525 may provide visual data to users. In a non-limiting example, a computer monitor may be a suitable visual display device 525. In the present non-limiting example, the computer monitor may show user's 105 own uploaded data and/or data from other users. Further, in the present embodiment, data from multiple users may be viewable and/or audible simultaneously.

Figure 6:
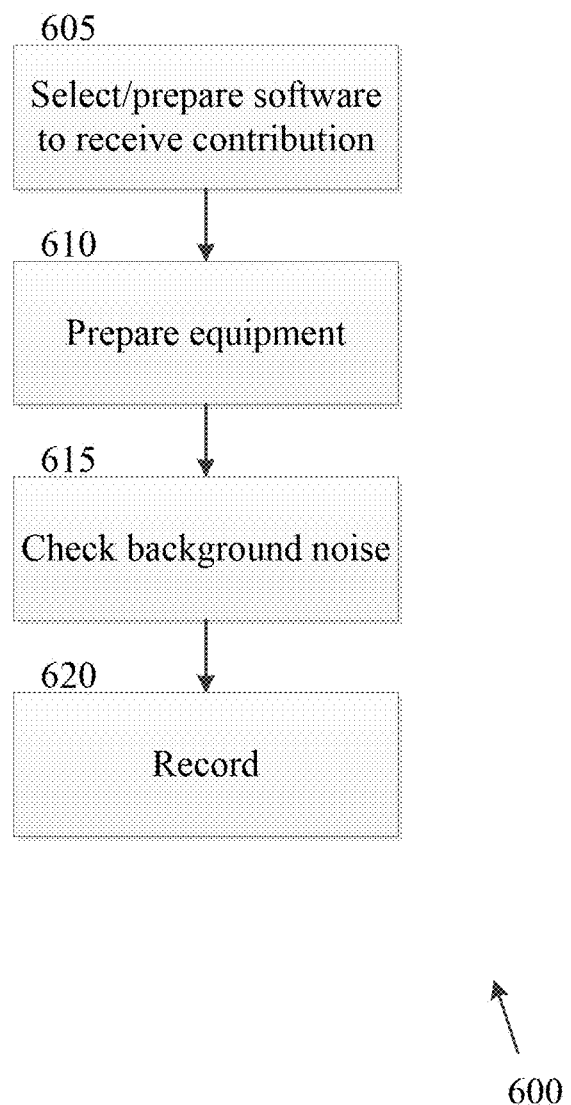
FIG. 6 is an illustration of an exemplary method of use of an exemplary system, in accordance with an embodiment of the present invention.

FIG. 6 is an illustration of an exemplary method of use of an exemplary system, in accordance with an embodiment of the present invention. In the present embodiment, a user may prepare system software to receive user's contribution in a step 605. In some embodiments, users may prepare software in a variety of ways, including, without limitation, selecting data to contribute to, enter details/information about data to be submitted, etc. In the present embodiment, a user may prepare equipment in a step 610. In some embodiments, users may prepare equipment in a variety of way, including, without limitation, putting on headphones 520, prepare instrument 515, etc. In the present embodiment, a user may check background noise in a step 615. In some embodiments, system software may provide data to users regarding background noise. In some of these embodiments, users may check background noise levels before beginning to record. In the present embodiment, a user may record user activities in a step 620. In some embodiments, any steps may be performed in any order.

Figure 7:
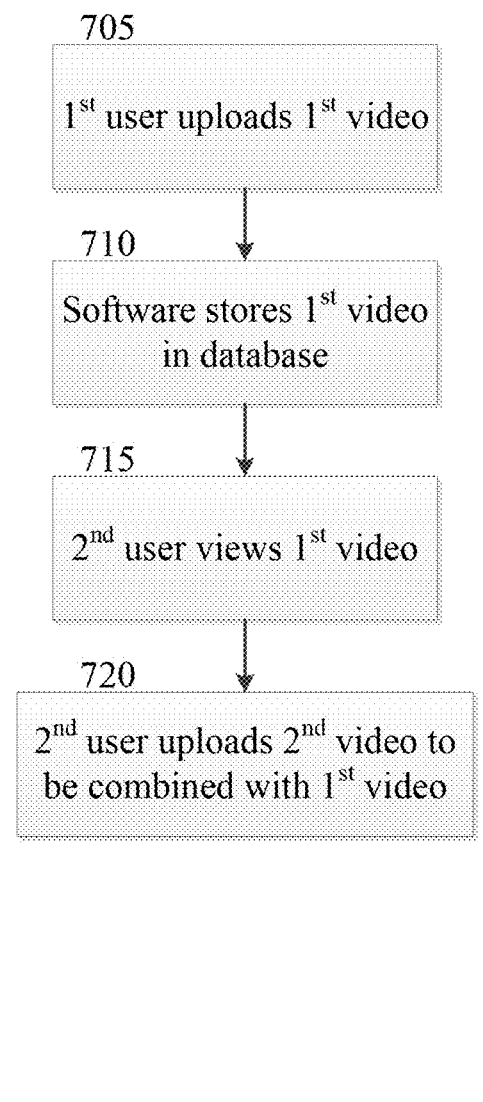
FIG. 7 is an illustration of an exemplary method of layering of data samples, in accordance with an embodiment of the present invention.

FIG. 7 is an illustration of an exemplary method of layering of data samples, in accordance with an embodiment of the present invention. In the present embodiment, a first user may submit a first set of data in a step 705. In some embodiments, data may be in any suitable form, including, without limitation, video or audio. In the present embodiment, system software may store first set of data in a step 710. In some embodiments, data may be stored by any suitable means, including, without limitation, a database. In the present embodiment, a second user may use system software to view first user's first set of data in a step 715. Further, in the present embodiment, second user may submit a second set of data which software may associate with first set of data. In a non-limiting example, software may layer both sets of data to create a combined set of data.

Figure 8:
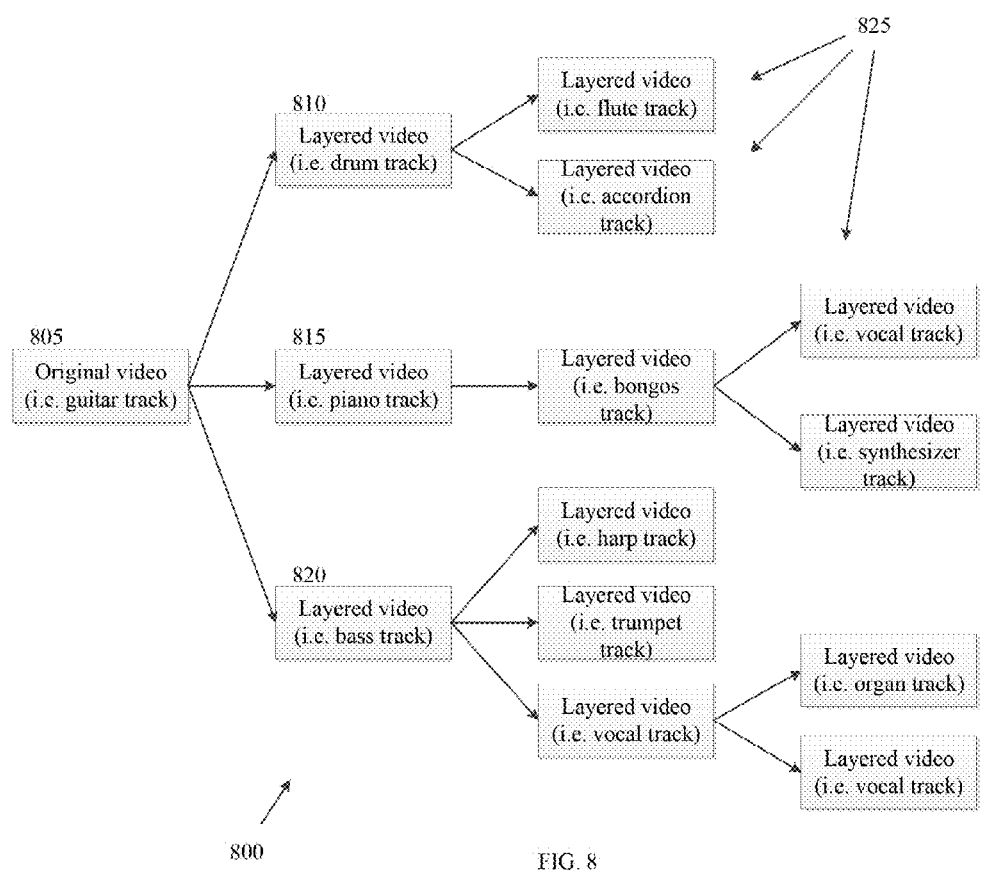
FIG. 8 is an illustration of an exemplary diagram showing chains of user-submitted data, in accordance with an embodiment of the present invention.

FIG. 8 is an illustration of an exemplary diagram showing chains of user-submitted data, in accordance with an embodiment of the present invention. In the present embodiment, a user may submit an original data sample 805. In a non-limiting example, the original data sample 805 may be a guitar track. In some embodiments, an original user and/or any number of other users may view a submitted data sample and/or submit a data sample to be associated with the submitted data sample. In the present embodiment, three subsequent data samples 810, 815, 820 may be submitted as layered samples associated with the original data sample 805. Further, in the present embodiment, further data sample 825 may be submitted as layered samples of previous layered data samples. In some embodiment, any number of submissions may be associated with a given data sample.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 3:
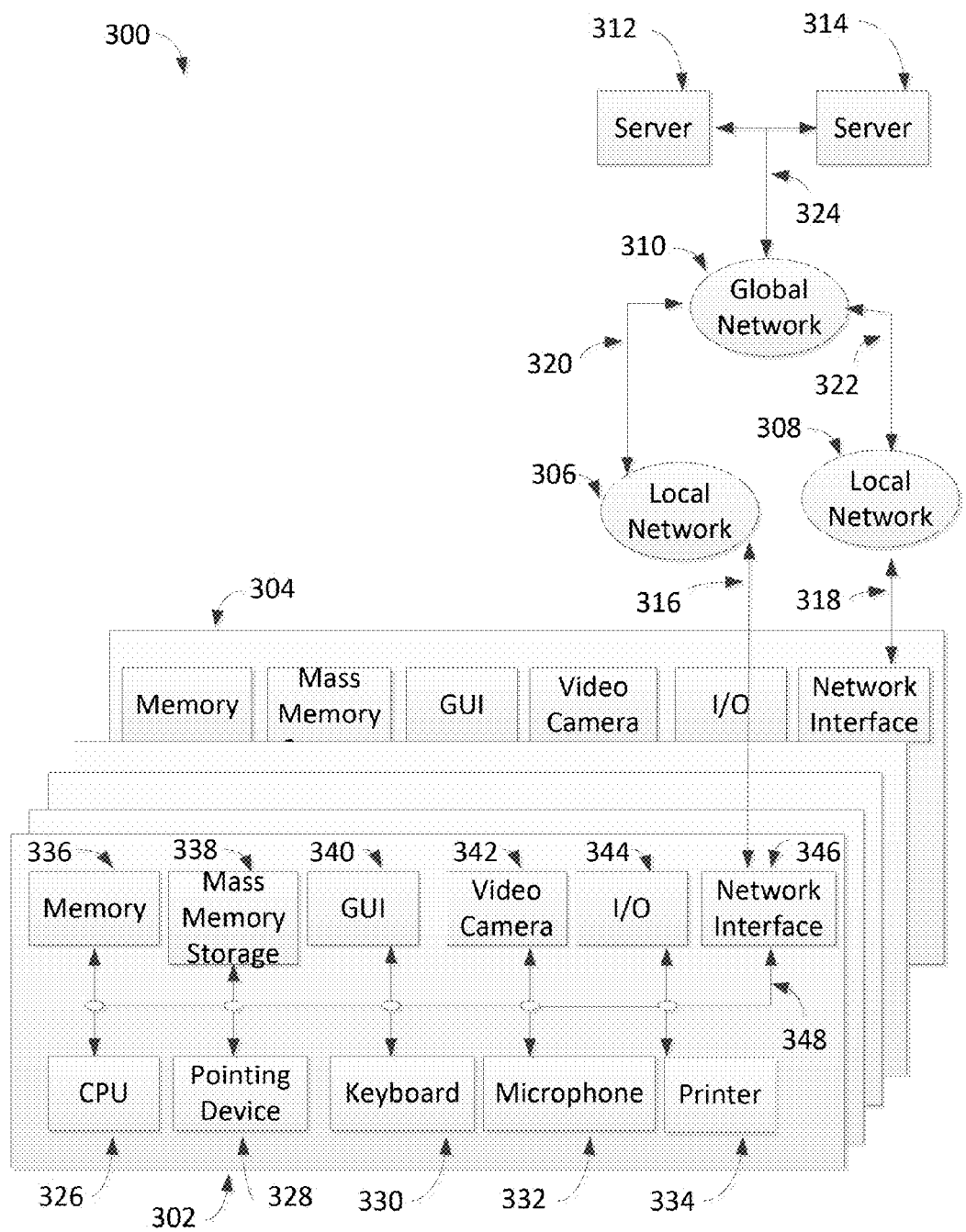
FIG. 3 is a block diagram depicting an exemplary client/server system which may be used by an exemplary web-enabled/networked embodiment of the present invention.

FIG. 3 is a block diagram depicting an exemplary client/server system which may be used by an exemplary web-enabled/networked embodiment of the present invention.

A communication system 300 includes a multiplicity of clients with a sampling of clients denoted as a client 302 and a client 304, a multiplicity of local networks with a sampling of networks denoted as a local network 306 and a local network 308, a global network 310 and a multiplicity of servers with a sampling of servers denoted as a server 312 and a server 314.

Client 302 may communicate bi-directionally with local network 306 via a communication channel 316. Client 304 may communicate bi-directionally with local network 308 via a communication channel 318. Local network 306 may communicate bi-directionally with global network 310 via a communication channel 320. Local network 308 may communicate bi-directionally with global network 310 via a communication channel 322. Global network 310 may communicate bi-directionally with server 312 and server 314 via a communication channel 324. Server 312 and server 314 may communicate bi-directionally with each other via communication channel 324. Furthermore, clients 302, 304, local networks 306, 308, global network 310 and servers 312, 314 may each communicate bi-directionally with each other.

In one embodiment, global network 310 may operate as the Internet. It will be understood by those skilled in the art that communication system 300 may take many different forms. Non-limiting examples of forms for communication system 300 include local area networks (LANs), wide area networks (WANs), wired telephone networks, wireless networks, or any other network supporting data communication between respective entities.

Clients 302 and 304 may take many different forms. Non-limiting examples of clients 302 and 304 include personal computers, personal digital assistants (PDAs), cellular phones and smartphones.

Client 302 includes a CPU 326, a pointing device 328, a keyboard 330, a microphone 332, a printer 334, a memory 336, a mass memory storage 338, a GUI 340, a video camera 342, an input/output interface 344 and a network interface 346.

CPU 326, pointing device 328, keyboard 330, microphone 332, printer 334, memory 336, mass memory storage 338, GUI 340, video camera 342, input/output interface 344 and network interface 346 may communicate in a unidirectional manner or a bi-directional manner with each other via a communication channel 348. Communication channel 348 may be configured as a single communication channel or a multiplicity of communication channels.

CPU 326 may be comprised of a single processor or multiple processors. CPU 326 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 336 is used typically to transfer data and instructions to CPU 326 in a bi-directional manner. Memory 336, as discussed previously, may include any suitable computer-readable media, intended for data storage, such as those described above excluding any wired or wireless transmissions unless specifically noted. Mass memory storage 338 may also be coupled bi-directionally to CPU 326 and provides additional data storage capacity and may include any of the computer-readable media described above. Mass memory storage 338 may be used to store programs, data and the like and is typically a secondary storage medium such as a hard disk. It will be appreciated that the information retained within mass memory storage 338, may, in appropriate cases, be incorporated in standard fashion as part of memory 336 as virtual memory.

CPU 326 may be coupled to GUI 340. GUI 340 enables a user to view the operation of computer operating system and software. CPU 326 may be coupled to pointing device 328. Non-limiting examples of pointing device 328 include computer mouse, trackball and touchpad. Pointing device 328 enables a user with the capability to maneuver a computer cursor about the viewing area of GUI 340 and select areas or features in the viewing area of GUI 340. CPU 326 may be coupled to keyboard 330. Keyboard 330 enables a user with the capability to input alphanumeric textual information to CPU 326. CPU 326 may be coupled to microphone 332. Microphone 332 enables audio produced by a user to be recorded, processed and communicated by CPU 326. CPU 326 may be connected to printer 334. Printer 334 enables a user with the capability to print information to a sheet of paper. CPU 326 may be connected to video camera 342. Video camera 342 enables video produced or captured by user to be recorded, processed and communicated by CPU 326.

CPU 326 may also be coupled to input/output interface 344 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 326 optionally may be coupled to network interface 346 which enables communication with an external device such as a database or a computer or telecommunications or internet network using an external connection shown generally as communication channel 316, which may be implemented as a hardwired or wireless communications link using suitable conventional technologies. With such a connection, CPU 326 might receive information from the network, or might output information to a network in the course of performing the method steps described in the teachings of the present invention.

Figure 4:
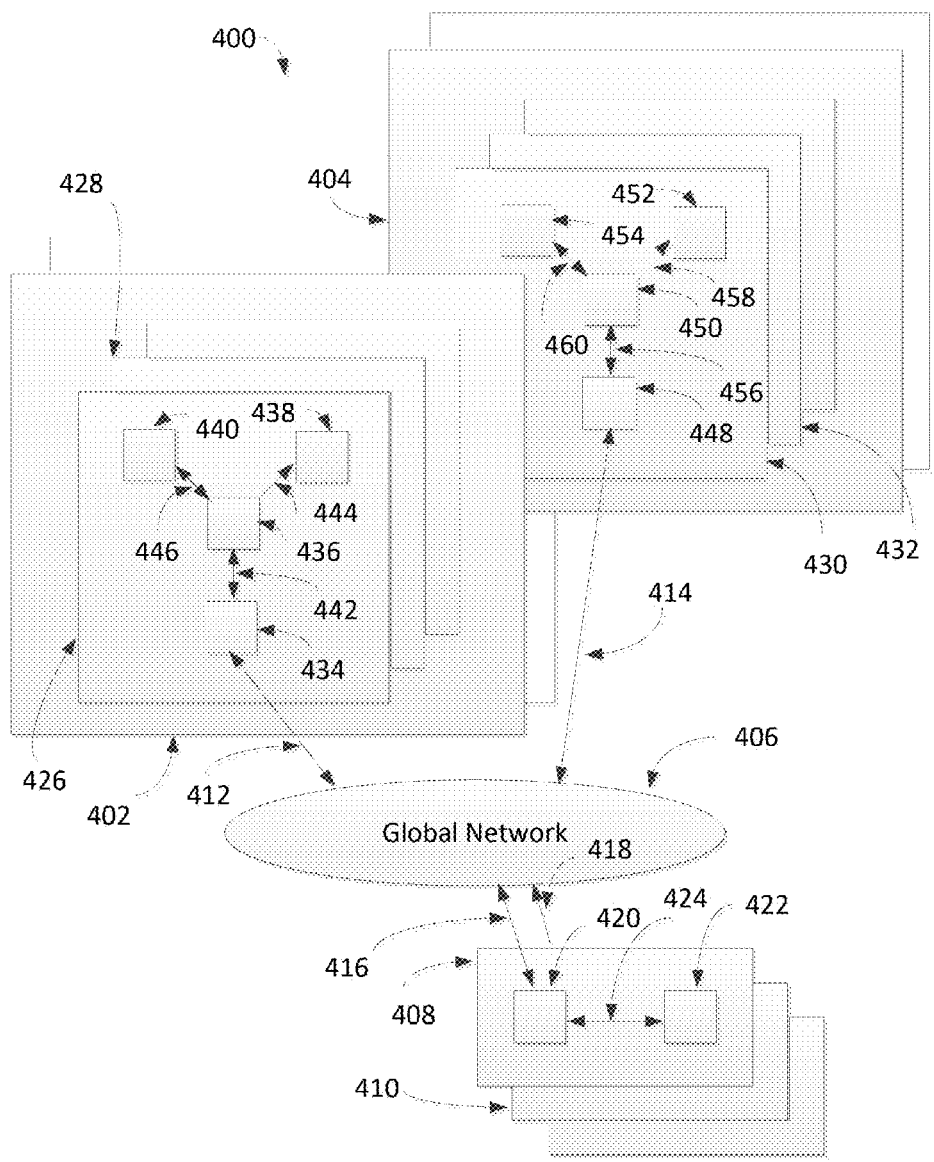
FIG. 4 illustrates a block diagram depicting a conventional client/server communication system.

FIG. 4 illustrates a block diagram depicting a conventional client/server communication system.

A communication system 400 includes a multiplicity of networked regions with a sampling of regions denoted as a network region 402 and a network region 404, a global network 406 and a multiplicity of servers with a sampling of servers denoted as a server device 408 and a server device 410.

Network region 402 and network region 404 may operate to represent a network contained within a geographical area or region. Non-limiting examples of representations for the geographical areas for the networked regions may include postal zip codes, telephone area codes, states, counties, cities and countries. Elements within network region 402 and 404 may operate to communicate with external elements within other networked regions or within elements contained within the same network region.

In some implementations, global network 406 may operate as the Internet. It will be understood by those skilled in the art that communication system 400 may take many different forms. Non-limiting examples of forms for communication system 400 include local area networks (LANs), wide area networks (WANs), wired telephone networks, cellular telephone networks or any other network supporting data communication between respective entities via hardwired or wireless communication networks. Global network 406 may operate to transfer information between the various networked elements.

Server device 408 and server device 410 may operate to execute software instructions, store information, support database operations and communicate with other networked elements. Non-limiting examples of software and scripting languages which may be executed on server device 408 and server device 410 include C, C++, C# and Java.

Network region 402 may operate to communicate bi-directionally with global network 406 via a communication channel 412. Network region 404 may operate to communicate bi-directionally with global network 406 via a communication channel 414. Server device 408 may operate to communicate bi-directionally with global network 406 via a communication channel 416. Server device 410 may operate to communicate bi-directionally with global network 406 via a communication channel 418. Network region 402 and 404, global network 406 and server devices 408 and 410 may operate to communicate with each other and with every other networked device located within communication system 400.

Server device 408 includes a networking device 420 and a server 422. Networking device 420 may operate to communicate bi-directionally with global network 406 via communication channel 416 and with server 422 via a communication channel 424. Server 422 may operate to execute software instructions and store information.

Network region 402 includes a multiplicity of clients with a sampling denoted as a client 426 and a client 428. Client 426 includes a networking device 434, a processor 436, a GUI 438 and an interface device 440. Non-limiting examples of devices for GUI 438 include monitors, televisions, cellular telephones, smartphones and PDAs (Personal Digital Assistants). Non-limiting examples of interface device 440 include pointing device, mouse, trackball, scanner and printer. Networking device 434 may communicate bi-directionally with global network 406 via communication channel 412 and with processor 436 via a communication channel 442. GUI 438 may receive information from processor 436 via a communication channel 444 for presentation to a user for viewing. Interface device 440 may operate to send control information to processor 436 and to receive information from processor 436 via a communication channel 446. Network region 404 includes a multiplicity of clients with a sampling denoted as a client 430 and a client 432. Client 430 includes a networking device 448, a processor 450, a GUI 452 and an interface device 454. Non-limiting examples of devices for GUI 438 include monitors, televisions, cellular telephones, smartphones and PDAs (Personal Digital Assistants). Non-limiting examples of interface device 440 include pointing devices, mousse, trackballs, scanners and printers. Networking device 448 may communicate bi-directionally with global network 406 via communication channel 414 and with processor 450 via a communication channel 456. GUI 452 may receive information from processor 450 via a communication channel 458 for presentation to a user for viewing. Interface device 454 may operate to send control information to processor 450 and to receive information from processor 450 via a communication channel 460.

For example, consider the case where a user interfacing with client 426 may want to execute a networked application. A user may enter the IP (Internet Protocol) address for the networked application using interface device 440. The IP address information may be communicated to processor 436 via communication channel 446. Processor 436 may then communicate the IP address information to networking device 434 via communication channel 442. Networking device 434 may then communicate the IP address information to global network 406 via communication channel 412. Global network 406 may then communicate the IP address information to networking device 420 of server device 408 via communication channel 416. Networking device 420 may then communicate the IP address information to server 422 via communication channel 424. Server 422 may receive the IP address information and after processing the IP address information may communicate return information to networking device 420 via communication channel 424. Networking device 420 may communicate the return information to global network 406 via communication channel 416. Global network 406 may communicate the return information to networking device 434 via communication channel 412. Networking device 434 may communicate the return information to processor 436 via communication channel 442. Processor 446 may communicate the return information to GUI 438 via communication channel 444. User may then view the return information on GUI 438.

FIG. 5 illustrates an example of one user contributing, and the process that it could entail.

A user 501 anywhere in the world can use jampede on a computer 502, or any internet connected device. When ready, the computer 502 will display visual instructions, and the user 501 will prepare instrument 504, and user 501 will place earphones 503 or any other listening device on so prior audio can be heard. When user 501 is ready, he/she will set video camera 505 or any other recording instrument to record playing along with prior recordings from computer 502. Earphones 503 are to eliminate previous noise. Ideally the only sound the recording will only have is the noise from the instrument 504.

FIG. 6 illustrates a diagram depicting an example of the jampede process.

After a user records a video/audio, the user uploads it to jampede 601. Jampede's database 602 processes the video, and makes it available for everyone to see and to contribute to. Another user 603, views the prior video upload 602. The second user 603 then records themselves playing while listening to prior recording 602. When second user 603 matches up audio and completes the process, he/she uploads the contribution to jampede's database 605. Jampede's database 605 combines audio from both videos, 602 and 604, and links them together. Both videos and audio have been modified so they can be viewed/listened to together 605.

To any future listeners, they can see both videos and listen to audio from prior videos on one screen 606. This is where the combined music comes together, and the audio is layered/overlapped. Both musician's videos can be viewed side-by-side, or in a full screen view. This screen 606 is an example of what most viewable videos might look like, but an infinite number of videos can be viewed on this screen 606, but this depends on how many uploads there are. Any other users can repeat this process to make more videos in the sequence 607.

FIG. 7 illustrates an example of users contributing to the site.

A user creates a video without listening to a prior video 701, also known as an original or source video. Another user uploads their contribution and matches audio up 702. Other users 703, 704, 705, 706, 707, 708, 709, and 710 are all contributing based off the user 701 and other user 702 contributions. This can be repeated unlimitedly 724.

Another example is user 711 listens to user 701 and user 711 uploads a contribution and matches audio up. Other users 712, 713, 714, 715, and 716 are all contributing based off user 701 and other user 711 contributions. This can be repeated unlimitedly 724.

Another example is user 717 listens to user 701 and user 717 uploads a contribution and matches audio up. Other users 718, 719, 720, 721, and 722 are all contributing based off user 701 and other user 717 contributions. This can be repeated unlimitedly 724.

After the most recent upload and the thread has stopped 723, there is always room for other contributions. This thread is awaiting other users to contribute. Other users listen and want to contribute, any of their contributions can also be an original or source video, but this is not automatic, though it is an option.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6). In some embodiments, the methods and/or system components which may be located and/or performed remotely include, without limitation: collaborating users It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breath life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing collaboration of data according to the present invention will be apparent to those skilled in the art. Various aspects of the invention have been described above by way of illustration, and the specific embodiments disclosed are not intended to limit the invention to the particular forms disclosed. The particular implementation of the collaboration of data may vary depending upon the particular context or application. By way of example, and not limitation, the collaboration of data described in the foregoing were principally directed to musical implementations; however, similar techniques may instead be applied to other forms of recorded material, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of musical collaboration comprising the steps of:
   providing a first recording device, wherein the first recording device has at least a first camera, a first microphone, and a first visual display;
   providing a first musical instrument; preparing software to receive a first musical contribution; preparing the first musical instrument for play;
   conducting a first background noise check;
   recording an original source video from a first musician user, wherein the source video has an audio component and video component;
   providing a server system, wherein the server system, is configured to receive video/audio uploads from the first musician user;
   uploading the original source video from the first musician user to the server system;
   presenting the original source video from the first musician user for public view;
   viewing, by a second musician user, the original source video;
   providing a second recording device, wherein the second recording device has at least a second camera, a second microphone, and a second visual display;
   providing a second musical instrument;
   preparing software to receive a second musical contribution;
   preparing the second musical instrument for play;
   conducting a second background noise check;
   recording a first collaboration video from the second musician user, wherein the collaboration video has an audio component and video component;
   uploading the first collaboration video from the second musician user;
   layering audio component from the original source video and the audio component from first collaboration video, whereby the audio component from the original source video and the audio component from the first collaboration video is synchronized, wherein the server system is configured to process the original source video and the first collaboration video into a layered collaboration having the same video file format, wherein the original source video and the first collaboration video are uneditable, wherein the method of music collaboration is public access open collaboration.

2. The method as recited in claim 1, in which the server system is further configured to attach a music visualization to a contribution comprising only audio.

3. The method as recited in claim 1, further comprising the step of synchronizing the first collaboration video to the original source video.

4. The method as recited in claim 3, in which synchronized videos of a collaboration are semi-linked.

5. The method as recited in claim 1, in which said receiving further comprises receiving a virtual metronome from the server system for use during said recording.

6. The method as recited in claim 1, in which the processing of the contribution into the collaboration is performed asynchronously.

7. The method as recited in claim 1, in which the server system is further configured to support social networking.

8. The method as recited in claim 1, in which the contribution comprises a video string into which the audio is layered.

* * * * *